April 14, 1936.  W. B. ANDERSON  2,037,520

LIQUID CONGEALING APPARATUS

Filed July 25, 1935

WITNESSES:

INVENTOR
WILLIAM B. ANDERSON.
BY
ATTORNEY

Patented Apr. 14, 1936

2,037,520

UNITED STATES PATENT OFFICE 2,037,520

LIQUID CONGEALING APPARATUS

William B. Anderson, Springfield, Mass., assignor to Westinghouse Electric & Manufacturing Company, East Pittsburgh, Pa., a corporation of Pennsylvania Application July 25, 1935, Serial No. 33,044

9 Claims. (Cl. 62—108.5)

My invention relates to liquid congealing apparatus and particularly to liquid congealing apparatus for forming ice cubes suitable for domestic use.

It is an object of my invention to provide an improved flexible grid structure from which ice cubes may be readily removed without the application of heat.

It is another object of my invention to provide improved liquid congealing apparatus in which the ice cubes and dividing grid structure are readily removed from the congealing container by mechanical ejecting means.

It is a further object of my invention to provide improved mechanical ejecting means for liquid congealing apparatus.

These and other objects are effected by my invention as will be apparent from the following description and claims taken in connection with the accompanying drawing, forming a part of this application, in which:

Figure 1:
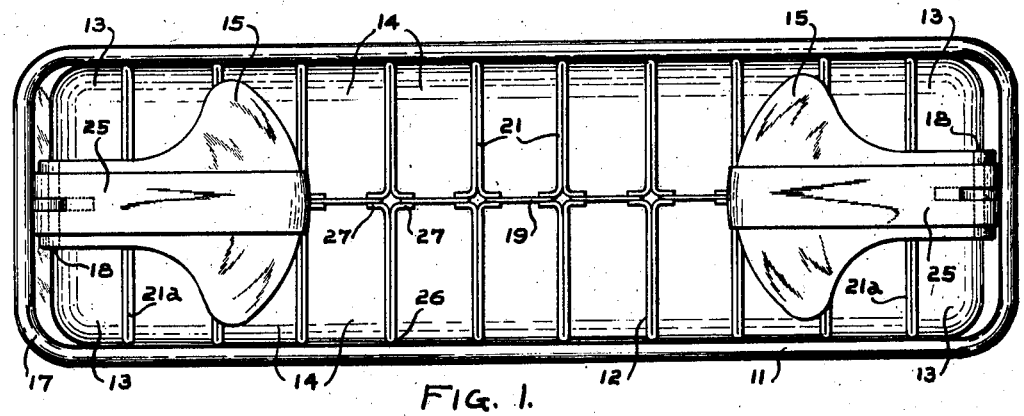
Fig. 1 is a top view of a pan for freezing ice with my improved grid structure disposed therein.

Referring specifically to the drawing for a detailed description of my invention, numeral 11 designates a pan member for containing liquid to be frozen. A flexible metallic grid member, designated at 12, of the general type disclosed and claimed in application Ser. No. 698,513 filed November 17, 1933 by G. A. Leyner and W. B. Anderson for Ice tray and grid and also assigned to Westinghouse Electric & Manufacturing Company, is disposed in the pan member 11 and divides the pan into four corner cells 13 and a series of cells 14 extending in two rows between the corner cells.

Mechanical ejecting means comprising lever members 15 are provided on the grid 12 to remove the grid from the pan 11 after liquid has been congealed therein. Shoe members 16 attached to the longitudinal extremities of the grid 12 provide for a pivot 18 for the levers 15, so that when the levers 15 are rotated outwardly, a bearing portion 25 of the levers bears on a lip 17 of the pan 11 and raises the grid 12, thus breaking the bond between the frozen liquid and the pan 11. After the flexible grid and frozen liquid have been removed from the pan 11, the levers may be utilized to flex the grid to remove the frozen liquid therefrom.

The mechanical ejecting means herein described is fully described and claimed in the co-pending application of Jules N. Saler, Serial No. 17,220 filed April 19, 1935 for Liquid congealing apparatus, and assigned to the Westinghouse Electric & Manufacturing Company, and further description thereof is believed to be unnecessary.

I have found that, when metallic flexible grids are constructed with the central longitudinal wall member of two detached sheets of metal, that there may be a tendency for the two sheets to spread when the ejecting device is operated, with the result that a few of the cubes may not be broken away from the pan 11, and for this reason, difficulty may be encountered in removing some of the cubes from the pan. In order to obviate this difficulty, and to provide an extremely flexible metallic grid structure, so that frozen liquid may readily be removed therefrom, I form a central longitudinal division wall structure 19 of separate flexible pieces of metal, preferably of single thickness, as clearly shown in Figs. 1 and 3. A series of secondary wall members 21 and 21a, projecting from both sides of the longitudinal division wall structure 19, are disposed in spaced relation to form, with the longitudinal wall 19 and pan member 11, the ice cells 13 and 14.

Figure 2:
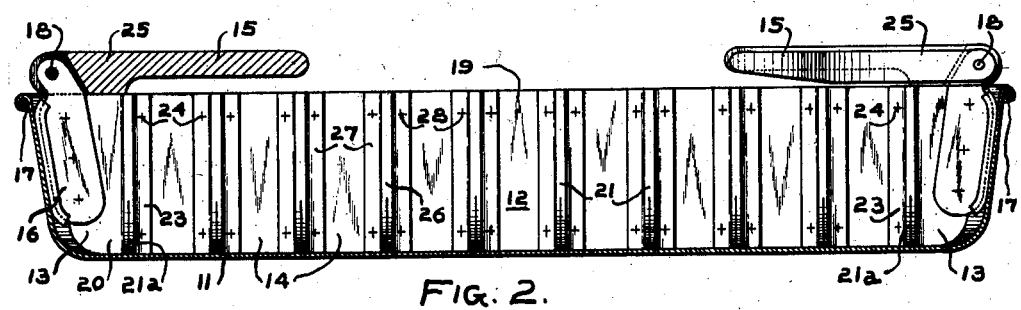
Fig. 2 is a sectional elevation of the pan and grid structure shown in Fig. 1.
Figure 3:
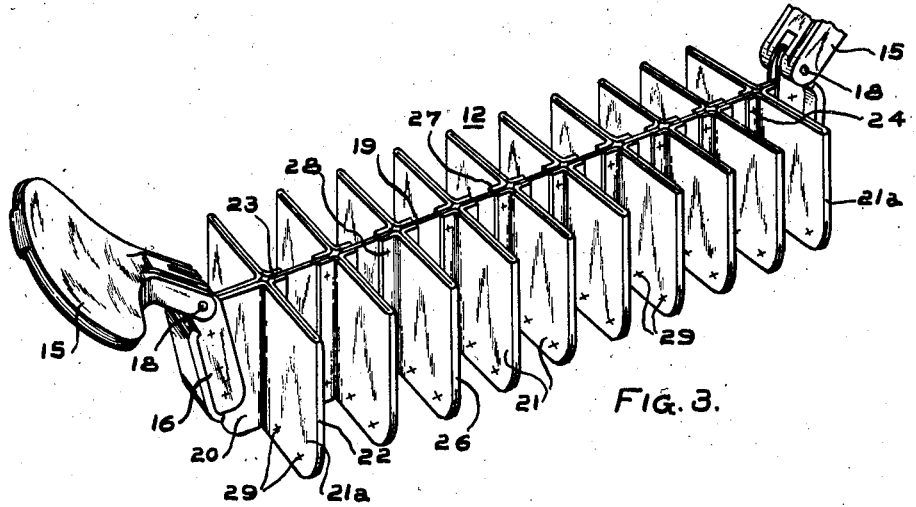
Fig. 3 is a perspective view of the grid structure shown in Fig. 1.
Figure 4:
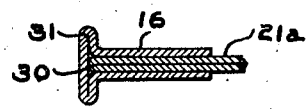
Fig. 4 is a detail view of the shoe member for the grid structure.

The two secondary wall members 21a are disposed at the longitudinal extremities of the grid structure 12 and are each formed preferably of a single sheet of flexible metal bent at its outer end 22 and having one of its inner ends 23 bent parallel to the longitudinal wall structure 19 and fastened thereto, preferably by welding at 24 as shown in Figs. 2 and 3. The other inner end 20 is also folded at 30 and is bent parallel to the longitudinal wall member 19 and the shoe member 16 is fastened to the secondary wall member 21a preferably by welding.

The remaining secondary wall members 21 are preferably bent at 26 at their outer ends, and have their inner ends 27 bent parallel to the longitudinal wall structure 19 and are secured by welding at 28 to respective adjacent longitudinal wall members 19. The resulting grid structure is extremely flexible in all directions, and the bottoms of the secondary wall members 21 and 21a are, therefore, preferably spot welded at 29 to impart stiffness to the grid structure 12 so that it will not flex upwardly when the mechanical ejecting means is operated. This ensures that the grid structure 12 will be lifted along its entire length to break the bond between the frozen liquid and the pan 11, but does not impair the flexibility of the structure in other directions. Similar stiffening means is described and claimed in a copending application of Jules N. Saler, Serial No. 710,611, filed February 10, 1934, for Ice freezing device and also assigned to the Westinghouse Electric & Manufacturing Company.

The shoe member 16 is provided with a flat portion 31 which centers the flexible grid 12 and prevents abrasion between the pan 11 and the grid 12 when the ejecting means is operated. The shoe member, therefore, provides for the pivot 18 for the levers 15, centers the grid 12, prevents cutting of the ice pan 11 and serves as a stiffening member for the grid 12 at its extremities.

From the foregoing, it will be apparent that I have provided an improved flexible grid structure for forming ice cubes for domestic use, which flexible grid structure is removable from a pan for containing frozen liquid with minimum effort and at the same time all of the ice cubes are broken loose from the pan member. Furthermore, I have provided an improved shoe member for the flexible grid which performs the several desirable functions hereinbefore recited.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth by the appended claims.

What I claim is:

1. A flexible grid structure for dividing a pan for producing ice into four corner cells and a series of intermediate cells disposed in rows and extending between the corner cells, comprising a flexible longitudinally-extending division wall structure and a series of secondary walls projecting transversely from each side of said longitudinal wall structure and disposed in spaced relation with respect to each other to define opposing sides of said intermediate cells, said longitudinally-extending division wall structure being composed of a single thickness of metal and said respective secondary walls being formed of two sheets of flexible metal disposed in abutting relation, joined at their outer ends and having their inner ends bent outwardly from each other adjacent the longitudinal division wall structure and secured, respectively, to the latter.

2. A flexible grid structure for dividing a pan for producing ice cubes into four corner cells and a series of intermediate cells disposed in rows and extending between the corner cells comprising a flexible, longitudinally-extending division wall structure and a series of secondary walls projecting transversely from each side of said longitudinal wall structure and disposed in spaced relation with respect to each other to define opposing sides of said intermediate cells, said longitudinally-extending division wall structure being formed of a single thickness of metal and said respective secondary cells being formed of a thin strip of flexible metal having its outer end folded so as to form said wall of two sheets of metal disposed contiguous to each other and having the inner termini of said sheets located on a common side of the axis of said longitudinal division wall structure.

3. A flexible grid structure for dividing a pan for producing ice into four corner cells and a series of intermediate cells disposed in rows and extending between the corner cells, comprising a longitudinal wall structure and a series of secondary walls projecting transversely from said longitudinal wall structure and disposed in spaced relation with respect to each other to define opposing sides of said intermediate cells, said longitudinally-extending division wall structure embodying a plurality of separate members extending between said secondary walls, the respective secondary walls being formed of two sheets of flexible metal disposed in abutting relation, joined at their outer ends, and having their inner ends bent outwardly from each other adjacent the longitudinal division wall structure and secured, respectively, to separate members of said longitudinal division wall structure.

4. A flexible grid structure for dividing a pan for producing ice into four corner cells and at least two intermediate cells disposed between said corner cells, comprising a longitudinal wall structure and a series of secondary walls projecting transversely from both sides of said longitudinal wall structure and disposed in spaced relation with respect to each other to define opposing sides of said intermediate cells, said longitudinal division wall structure embodying at least one member extending between said secondary walls, and the secondary walls at the longitudinal extremities of said grid structure being formed of two sheets of flexible metal disposed in abutting relation, joined at their outer ends, and having one inner end bent outwardly adjacent the longitudinal division wall structure and secured to said longitudinal division wall member, and having the other end bent outwardly to form a part of said longitudinal division wall structure.

5. A flexible grid structure for dividing a pan for producing ice into four corner cells and at least two intermediate cells disposed between said corner cells, comprising a longitudinal wall structure and a series of secondary walls projecting transversely from both sides of said longitudinal wall structure and disposed in spaced relation with respect to each other to define opposing sides of said intermediate cells, said longitudinal division wall structure embodying at least one member extending between said secondary walls, and the secondary walls at the longitudinal extremities of said grid structure being formed of two sheets of flexible metal disposed in abutting relation, joined at their outer ends, and having one inner end bent outwardly adjacent the longitudinal division wall structure and secured to said longitudinal division wall member, and having the other end bent outwardly to form a part of said longitudinal division wall structure, said latter end being secured to the corresponding end of the secondary wall member at the same extremity of said longitudinal division wall structure, on the other side thereof.

6. In ice congealing apparatus, the combination of a pan for containing ice cubes, a flexible grid structure for dividing the pan into four corner cells and a series of intermediate cells disposed in rows and extending between the corner cells and comprising a longitudinally-extending division wall structure and a series of secondary walls projecting tranversely from each side of said longitudinal wall structure and disposed in spaced relation with respect to each other to define opposing sides of said intermediate cells, said longitudinally-extending division wall structure being of single thickness of metal, the respective secondary walls being formed of two sheets of flexible metal disposed in abutting relation, joined at their outer ends, and having their inner ends bent outwardly from each other adjacent the longitudinal division wall structure and secured, respectively, to the latter, and ejecting means for breaking the ice bond between the ice cubes and said pan.

7. In ice congealing apparatus, the combination of a flexible grid structure for dividing a pan for producing ice cubes into four corner cells and a series of intermediate cells disposed in rows and extending between the corner cells comprising a flexible, longitudinally-extending division wall structure and a series of secondary walls projecting transversely from each side of said longitudinal wall structure and disposed in spaced relation with respect to each other to define opposing sides of said intermediate cells, said longitudinally-extending division wall structure being of a single thickness of metal and said respective secondary walls being formed of a thin strip of flexible metal having its outer end folded so as to form said secondary walls of two sheets of metal disposed contiguous to each other and having the inner termini of said sheets located on a common side of the axis of said longitudinal division wall, and mechanical ejecting means for breaking the ice bond between the ice cubes and said pan.

8. In ice freezing apparatus, the combination of a pan for containing ice, a metallic grid structure for dividing the pan into a plurality of cells and mechanical ejecting means for removing the grid structure from said pan, said grid structure being provided with a shoe member at one of its longitudinal extremities, said shoe member including a flat portion abutting the inner surface of an end wall of the pan and adapted to prevent abrasion of the pan by the grid structure.

9. In ice freezing apparatus, the combination of a pan for containing ice, a metallic grid structure for dividing the pan into a plurality of cells and mechanical ejecting means for removing the grid structure from said pan, said grid structure being provided with a shoe member at each of its longitudinal extremities, each of said shoe members including a flat portion abutting the inner surfaces of the end walls of the pan and adapted to prevent abrasion of the pan by the grid structure, said shoe members also including pivot bearings for said mechanical ejecting means.

WILLIAM B. ANDERSON.